US007996206B2

(12) United States Patent
Bashford et al.

(10) Patent No.: US 7,996,206 B2
(45) Date of Patent: Aug. 9, 2011

(54) SERIAL ATTACHED SMALL COMPUTER SYSTEM INTERFACE (SAS) CONNECTION EMULATION FOR DIRECT ATTACHED SERIAL ADVANCED TECHNOLOGY ATTACHMENT (SATA)

(75) Inventors: Patrick R. Bashford, Fort Collins, CO (US); Brian A. Day, Colorado Springs, CO (US); Silvia E. Jaeckel, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 621 days.

(21) Appl. No.: 10/980,373

(22) Filed: Nov. 3, 2004

(65) Prior Publication Data
US 2006/0095630 A1    May 4, 2006

(51) Int. Cl.
G06F 9/455 (2006.01)
G06F 9/44 (2006.01)
G06F 13/00 (2006.01)
G06F 13/10 (2006.01)
G06F 13/12 (2006.01)

(52) U.S. Cl. ............................... 703/25; 710/62; 710/65
(58) Field of Classification Search ............... 703/25; 710/62, 65
See application file for complete search history.

(56) References Cited

U.S. PATENT DOCUMENTS

| 5,737,524 | A * | 4/1998 | Cohen et al. ................. 710/301 |
| 6,772,108 | B1 * | 8/2004 | Stolowitz ........................ 703/27 |
| 7,171,500 | B2 * | 1/2007 | Day et al. ...................... 710/106 |
| 2003/0184902 | A1 * | 10/2003 | Thiesfeld ........................ 360/48 |
| 2003/0220781 | A1 * | 11/2003 | Salmonsen et al. ............. 703/25 |
| 2004/0010660 | A1 * | 1/2004 | Konshak et al. .............. 711/114 |
| 2004/0019734 | A1 * | 1/2004 | Day et al. ...................... 710/315 |
| 2004/0117522 | A1 * | 6/2004 | Loffink et al. ................. 710/74 |
| 2004/0243386 | A1 * | 12/2004 | Stolowitz et al. .............. 703/25 |
| 2005/0138258 | A1 * | 6/2005 | Seto ............................. 710/301 |

* cited by examiner

*Primary Examiner* — David Silver
*Assistant Examiner* — Suzanne Lo
(74) *Attorney, Agent, or Firm* — Suiter Swantz pc llo

(57) ABSTRACT

The present invention is directed to a system and method for emulating a serial small computer system interface (SAS) connection for direct attached serial advanced technology attachment (SATA) communication are disclosed. A system in accordance with the present invention includes a host controller. The host controller includes a physical interface for accepting at least one of a SAS connection or a direct attached SATA device. A common interface logic configured to receive SAS communications and SATA communications having a SAS emulated connection is included in the host controller. An emulation logic is communicatively coupled to the common interface logic. The emulation logic being configured to determine a value of a ConnectedSata signal based on the state of a SATA link state machine.

15 Claims, 2 Drawing Sheets

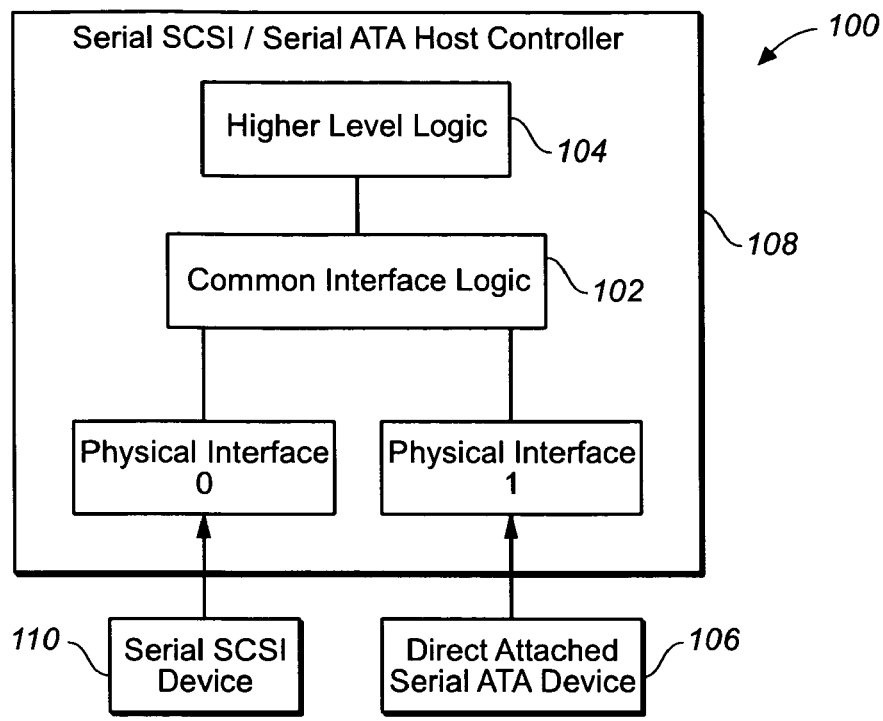
FIG._1
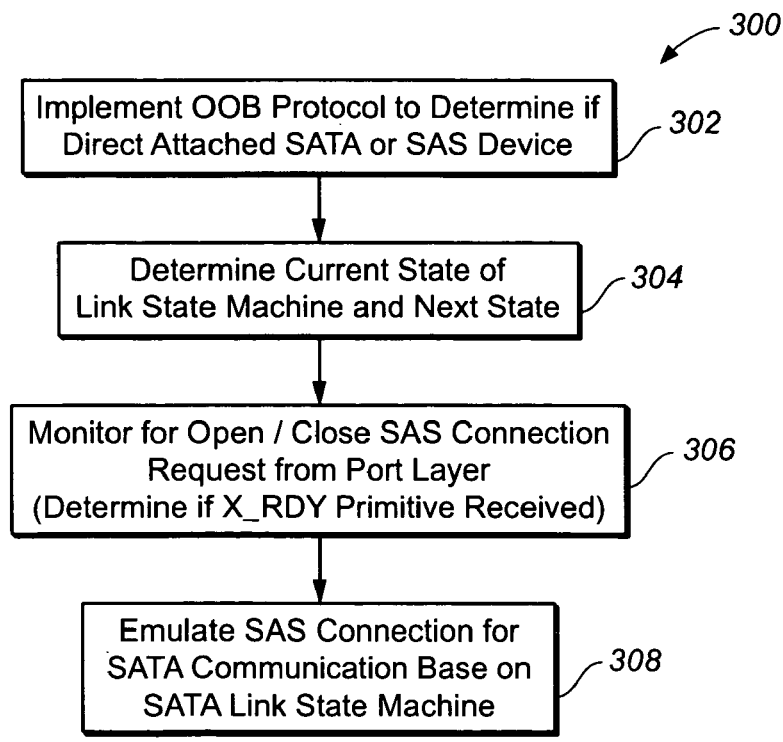
FIG._3

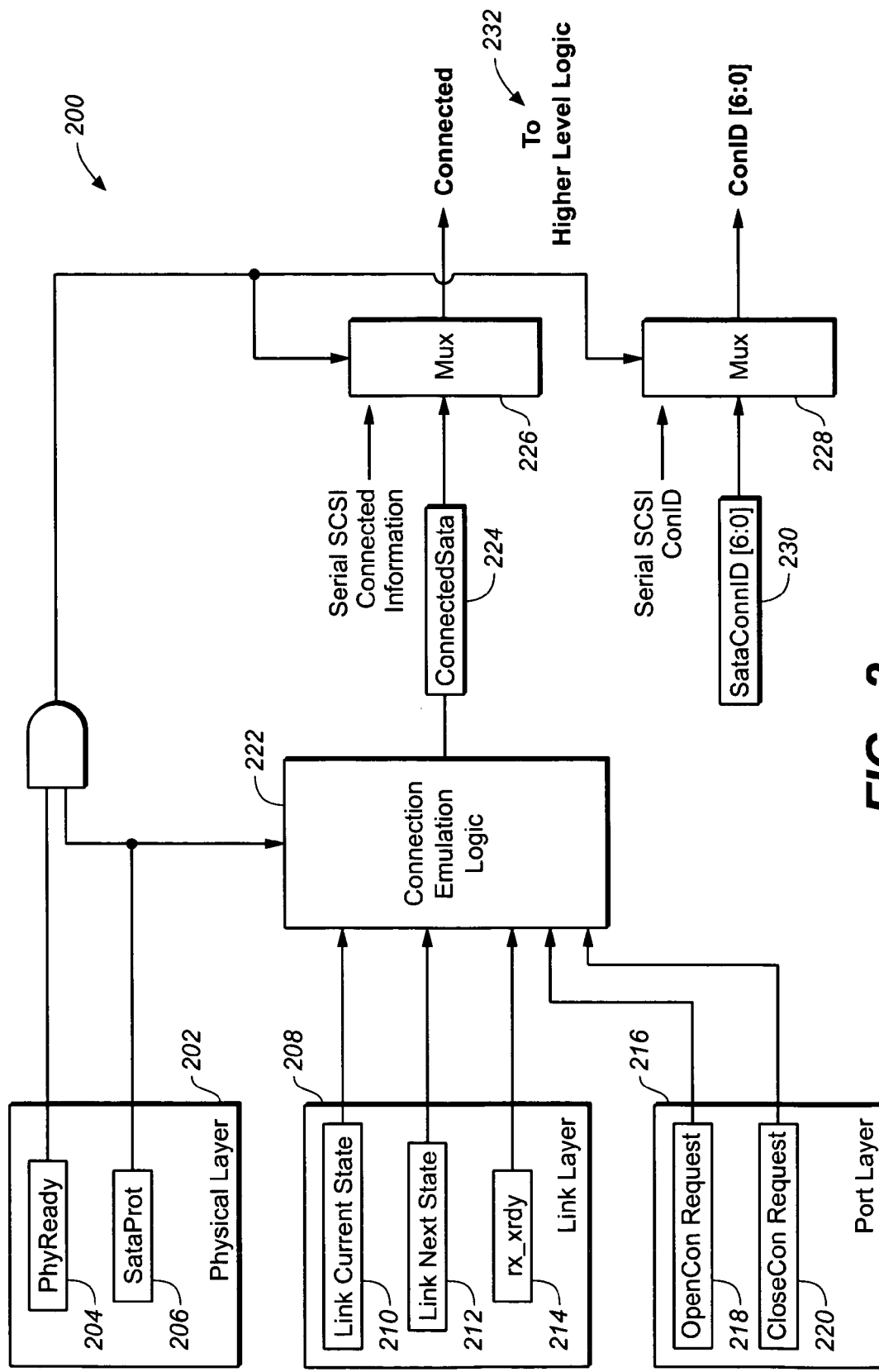
FIG._2

SERIAL ATTACHED SMALL COMPUTER SYSTEM INTERFACE (SAS) CONNECTION EMULATION FOR DIRECT ATTACHED SERIAL ADVANCED TECHNOLOGY ATTACHMENT (SATA)

FIELD OF THE INVENTION

The present invention relates to the field of data storage and particularly to a system and method for emulating serial attached small computer system interface (Serial SCSI or SAS) connection for utilization in direct attached serial advanced technology attachment (Serial ATA or SATA).

BACKGROUND OF THE INVENTION

Data storage system controllers often implement devices employing various communication protocols. Typically, host controllers implementing serial SCSI devices may also support serial ATA devices as well. A dual protocol capability may allow for hybrid systems with increased transactional performance offered by SCSI based drives while permitting back-up redundancy from lower cost serial ATA drives. As a result, the host controller includes a physical connection interface for both serial SCSI and serial ATA as well as the individual circuitry associated with the communication protocols for the different standards. The inclusion of circuitry for both serial SCSI and serial ATA requires additional chipset space thus increasing die size during manufacture and the expense associated with having a dual physical connection/communication protocol system. Furthermore, the complexity of a dual circuit system increases the cost of the host controller. Additionally, with the inclusion of both serial SCSI and serial ATA circuitry, the integration of devices implementing these protocols occurs at a higher level logic than if only one type of device is implemented. As a result, the higher level circuitry is required to handle the integration of data which-in-turn may effect data transfer performance in comparison to a single protocol controller.

Serial SCSI implements connections during communication between the host/device (initiator/target). Connections include a serial SCSI protocol (SSP), SCSI management protocol (SMP) and serial ATA tunneled protocol (STP). In contrast, during serial ATA communication, the host and device do not establish a connection as is done with SAS communication.

Therefore, it would be desirable to provide a method and system for emulating SAS connection for utilization with SATA devices/communication.

SUMMARY OF THE INVENTION

Accordingly, the present invention is directed to a system and method for emulating SAS connectivity for utilization with direct attached SATA devices.

In a first aspect of the invention, a system for emulating a serial small computer system interface (SAS) connection for direct attached serial advanced technology attachment (SATA) communication is disclosed. A host controller is included in the system. The host controller includes a physical interface for accepting a SAS connection and a physical interface for receiving a direct attached SATA device. Common interface logic is included in the host controller to receive SAS communications and SATA communications having a SAS emulated connection. An emulation logic is communicatively coupled to the common interface logic. The emulation logic being configured to determine a value of a ConnectedSata signal based on the state of a SATA link state machine.

In a further aspect of the invention, a system for emulating a SAS connection for SATA communication includes a host controller having a first physical interface for connecting with a SAS device and a second physical interface for connecting/accepting a SATA device. The host controller further includes an emulation logic for determining the value of a ConnectedSata signal for a SATA communication. The emulation logic may be configured to assert/deassert a ConnectedSata signal based on the state of a SATA link state machine. The host controller includes common interface logic configured for SAS communications and SATA communications having a SAS emulated connection. A high level logic, communicatively coupled to the common interface logic, is configured to receive only communications conforming to serial SCSI and pseudo SCSI communications (SATA communications having a pseudo SAS connection).

In an additional aspect, a method of emulating a SAS connection for direct attached SATA communication includes the steps of: implementing an out of band protocol to determine if an attached device is a direct attached SATA device or a SAS device; determining the current state of a link state machine and a next state of the link state machine; monitoring for an open/close SCSI link request from a port layer; and emulating a serial SCSI connection for SATA communications based on the state of the SATA link state machine such as to avoid interfering with ongoing communications.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is block diagram of a system for emulating a SAS connection for utilization with direct attached SATA communication;

FIG. 2 is a flow diagram of an emulation logic in accordance with an aspect of the present invention; and FIG. 3 is a flow diagram illustrating a method of emulating a SAS connection for SATA communication.

DETAILED DESCRIPTION OF THE INVENTION

Reference will now be made in detail to the presently preferred embodiments of the invention, examples of which are illustrated in the accompanying drawings.

Referring to FIG. 1, a system 100, such as employing a host controller 108 for utilization in a data storage device, including serial small computer system interface (serial SCSI or SAS) connection emulation is described. The system 100 implements common interface logic 104 to maximize circuitry common to both serial SCSI and direct attached serial advanced technology attachment (serial ATA or SATA) so as to minimize the complexity of the die, the size of the die, and the expense of the system 100. A system in accordance with the present aspect permits higher level logic to receive communications via the common interface logic 102 thus increasing the efficiency of the system 100. Furthermore, the system and method of the present invention may permit low level logic to provide a common communication scheme (i.e., by providing pseudo serial SCSI connection for SATA communication) so as to maximize the efficiency of controller firmware/higher level logic. The system 100 may implement emulation logic as is described with respect to FIG. 2 in order to emulate serial SCSI communication behavior when the host controller 108 is communicating with a direct attached SATA device 106. Additionally, the host controller 108 may communicate with a coupled SAS device 110. Thus, serial ATA communications may be passed to higher level logic 104 as if they conformed to SAS communication. Those of skill in the art will appreciate a variety of devices may be implemented, such as hard drives, tape storage systems, accessory devices, and the like, implementing SATA or SAS communication protocols. For example, the host controller 108 included in a data storage system may be communicatively coupled via cabling to a SATA hard drive and to a SAS device in order to maximize the transactional performance while maintaining redundancy in a cost effective manner such as may be achieved from directly attached SATA hard drives. While a multiple physical interface system is disclosed, in further embodiments, a single physical connection may be implemented. The foregoing system 100 permits hybridization without effecting host controller through-put associated with higher level controller firmware resources handling both communication protocols.

Referring now to FIG. 2 in a further aspect of the present invention, an emulation logic 200 configured for providing pseudo SAS connections is disclosed. In a preferred embodiment the emulation logic emulates SAS STP connection (serial ATA tunneling protocol). Those of skill in the art will appreciate that a normal SAS device communication may implement SSP connection (serial SCSI protocol), SMP connection (serial management protocol), or STP connection (serial ATA tunneling protocol). The emulation logic 200 of the present aspect may be included in a system such as a data storage system, an information handling system, and the like. For example, the emulation logic may be included as part of the common interface logic as described with respect to FIG. 1 (i.e., a sub-set of the common interface logic) or as a separate logic. Those of skill in the art will appreciate that the emulation logic may be formed as a combination of hardware (such as an application specific integrated circuit (ASIC), a chipset, a processing unit (a processor including firmware)) and/or software resident on a host controller, or the like, as desired. Furthermore, the emulation logic may be implemented to control the opening/closing of connections so as to prevent interruptions, streamline communication, and the like.

In the present embodiment, the emulation logic 200 has a physical layer 202, including a physical ready (PhyReady) register 204, for capturing or maintaining data indicating the status of a connection with a device. For instance, an out-of-band signal protocol (OOB) is utilized to permit host controller/device identification. OOB signaling may include a pattern of signal idle times and signal bursts so as to identify that a device is present. The PhyReady register 204 may include data indicating whether an OOB protocol has occurred. Thus, the data included in PhyReady register permits the emulation logic 200 to identify that the initial signaling (OOB) has occurred and transactions may commence with the device.

In the current embodiment, a SataProt register 206 is included in the physical layer 202 to capture or provide an indication of the type of attached device, e.g., which communication protocol the device implements. For example, the SataProt register may indicate if an attached device is a SAS device or a direct attached SATA device. The SataProt register data may be generated as a result of the OOB signal pattern, such as identified from a return signal generated during the OOB sequence, or the like identification method. For example, the SataProt register may be accessed to determine if an attached device is a SATA device or a SAS device such that the emulation logic 200 may provide emulated SAS connection data if the SataProt register 206 indicates the attached device is a SATA type device.

A link layer 208 is further included in the emulation logic 200. The link layer 208 may include a current link state register 210 for maintaining data associated with the current state of the link state machine, wherein the link state machine controls transmissions/receive operations. For example, data associated with transmit/receive communications occurring between the host controller and the device. In other words, the current link state register 210 may contain data associated with the current status of receive/transmission (framing structure) occurring with a device (i.e., the status of host link state machine) such that the emulation logic 200 is capable of preventing interruption of ongoing communications with a device such as if the higher level host controller logic 232 (such as described with respect to FIG. 1 or port layer) initiates a open or close request (i.e., a SAS open or close request). A next link state register 212 may be included for capturing or maintaining the next link state of the link state machine such that a port level request (i.e., from the higher level logic) does not interrupt ongoing communications with a device in-favor of a port level request.

An rx_xrdy register 214 is further included in the emulation logic 200 such as in the link layer 208 in order to indicate direct attached SATA device request status. The rx_xrdy register 214 may capture data associated with the last SATA primitive received by the link. For example, the rx_xrdy may include a "1" (one) or a high signal if the last primitive was a X_RDY primitive (SATA) (i.e., a request permission from a SATA device). Including a rx_xrdy register permits the emulation logic to determine that a SATA device is attempting to initiate a transaction when the link state machine is in an idle state.

A port layer 216 including an OpenCon Request register 218 and a CloseCon Request register 220 are included in the emulation logic for capturing or maintaining port layer requests (i.e., port layer interface signals). For example, the OpenCon Request register 218 may indicate the host controller common logic/higher level logic 232 is asserting a request, to the link, to open a SAS connection. Correspondingly, the CloseCon Request register 220 captures data associated with requests from the port layer to close a SAS connection. For example, the CloseCon Request register 220 indicates whether the higher level logic (such as described generally with respect to FIG. 1) is asserting a close communication request via the common interface logic 200 to terminate a SAS communication connection with a device. Those of skill in the art will appreciate that while a SAS communication is described with respect to the operation of a port layer 220, a pseudo-SAS communication (emulated direct attached SATA communications) will be handled by the OpenCon Request register and CloseCon Request register in the same fashion as a SAS communication as the emulation logic effectively communicates with the higher level logic 232 as if only SAS type communication is occurring. Those of skill in the art will appreciate that the physical layer, the link layer, and the port layer may be provided as a module of hardware (e.g., circuitry) and/or as a software module implementing a set of routines/data structures, a hybrid system, or the like.

A connection emulation logic 222 is included in the emulation logic 200. The connection emulation logic 222 is communicatively coupled with the Phy layer 202, the link layer 208 and the port layer 216, and incumbently the various maintained registers (e.g., PhyReady, Link Current State, OpenCon Request). The emulation logic determines a ConnectedSata value based on the status of the various registers such that emulated SAS connection data is forwarded to a ConnectedSata register 224 for SATA communications, thus emulating SAS communication for direct attached SATA device communications. Those of skill in the art will appreciate that the following algorithm implements link states in accordance with promulgated SATA (link state) standards. The connection emulation logic 222 is configured to implement the following algorithm to determine the value.

```
always @(negedge nReset or posedge WClk) begin
    if (!nReset) begin
        ConnectedSata <=#1 1 'b0;
    end else begin
        if (SataProt) begin
            if (OpenConReq) begin
                ConnectedSata <=#1 1 'b1;
            end else if ((link_sm_next_state == 'link_idle) &&
            CloseConReq) begin
                ConnectedSata <=#1 1 'b0;
            end else if ((link_sm_cur_state == 'link_idle) &&
            rx_xrdy) begin
                ConnectedSata <=#1 1 'b1;
            end else begin
                ConnectedSata <=#1 ConnectedSata;
            end
        end else begin
            ConnectedSata <=#1 1 'b0;
        end
    end
end.
```

Wherein the ConnectedSata is the value of the ConnectedSata register, SataProt is the value of the SataProt register, OpenConReq is a port layer open SAS connection request, CloseConReq is a port layer close SAS connection request, link_sm_next_state is the status of the next state of the link state machine, link_sm_cur_state is the status of the current-state of the link state machine, rx_xrdy is whether or not a X_RDY primitive was the last primitive. Those of skill in the art will appreciate that while the foregoing algorithm implements SATA specification link states other link states may be implemented as well. It is the intention of this disclosure to encompass and included such variation.

A connected multiplexer 226 (first multiplexer or MUX) is communicatively coupled to the Phy layer 202 and the ConnectedSata register 224. The connected multiplexer 226 selects between normal SAS connected information such as may be provided by a communicatively coupled SAS device and the pseudo SAS connected information from the ConnectedSata register 224 (determined by the connection emulation logic 222). In a preferred embodiment, the connected multiplexer is implemented (generally to select between the SAS information provided by a SAS device (normal SAS information) and pseudo SAS information generated by the emulation logic 200. For instance, the connected multiplexer 226 is configured to drive the connected signal going to a higher level host controller logic 232 from the ConnectedSata register 224, if the PhyReady register 204 and SataProt register 206 are both high, thus indicating a direct attached SATA device (i.e., an OOB signal pattern has occurred, a device is present and the device is a SATA device). In contrast, SAS information from an attached device is utilized if both the PhyReady and SataProt are not both high, in other words no emulation is required as the device is a SAS type device.

A SataConID register 230 and a ConID multiplexer 228 (second multiplexer or MUX) are communicatively coupled in the emulation logic 200. The SataConID register 230 may programmed with device ID information for a direct attached SATA device, if a SATA device is present. In the foregoing manner, the SataConID register may permit unique identification of a device(s) within the system topology in order to mimic a SAS communication which includes a SAS address to uniquely identify the device. The presence/absence of a SATA device may be determined by interrogating the SataProt register 206. A SATA device ID may be programmed into the ConID register by software (i.e., firmware) upon determining the connected device is a SATA type device. The ConID multiplexer 228 is included to select between the normally provided SAS ConID provided when a SAS device is present and a device ID associated with a SATA device included in the SataConID register 230 programmed by firmware if a SATA device is present. In a preferred embodiment, the ConID multiplexer implements the ConID register data for driving the connected signal if the PhyReady register 204 and the StatProt register 206 are high (i.e., OOB has been completed and a directly attached SATA device is present).

Referring to FIG. 3, in a further aspect of the invention, a method 300 of emulating serial small computer system interface (serial SCSI or SAS) is disclosed. The method 300 of the present aspect permits emulation of a SAS type connection for direct attached serial advanced technology attachment (serial ATA or SATA) communication.

Initially, an out-of-band (OOB) protocol is implemented 302 to determine if an attached device is present and if the device is a SATA type device or a SAS type device. For example, a series of idle times and burst signals, or the like, may be implemented to indicate the presence/absence of a device and the type of the device. Implementing OOB signaling may permit the host controller to identify the device, thus permitting normal SAS communication to occur or allow emulation of a SAS connection for a direct attached SATA device.

The current link state and the next link state of the host link state machine are determined 304 to avoid interrupting an ongoing communication with a port layer request. For example, the current and next link states are determined 304 to avoid transmit/reception interruptions. In an additional step, the last primitive received by the link state machine is obtained to determine if the primitive was a request permission from a SATA device (a X_RDY primitive).

A request to close a serial SCSI link and a request to open a serial SCSI link from a port layer are monitored 306 (such as by monitoring register(s) for capturing a port layer assert/deassert signals to determine if the common logic is requesting to open/close a SAS communication connection). Monitoring 306 allows for port layer requests to be asserted based on the status of the higher level logic, without requiring knowledge of the status of the SATA device. For example, monitoring for a CloseConReq signal 306 allows for a request to close the SAS connection to occur while not interfering with a presently occurring SATA transmit/receive transaction. In the foregoing case, the link is allowed to return to idle prior to indicating to the higher level logic that the connection was closed.

A serial SCSI connection is emulated 308 for a SATA communication based on the state of the SATA link state machine. Those of skill in the art will appreciate that emulation may occur via implementing logic for instituting the algorithm as disclosed above. Moreover, emulation 308 may take into account at least (in-part) the status of the Phy layer and the port layer (i.e., the status of the various registers included in these layers) to the extent the data contained in the registers indicates conditions impacting the connection emulation.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for emulating a serial small computer system interface (serial SCSI) connection for direct attached serial advanced technology attachment (serial ATA) communication, comprising:
   a host controller including a first physical interface configured to connect with a serial SCSI device and a second physical interface configured to connect with a serial ATA device, the host controller including:
      a common interface logic configured to receive serial SCSI communications and serial ATA communications having an emulated serial SCSI connection; and
      an emulation logic configured to emulate a serial SCSI connection between the second physical interface and the common interface logic by providing emulated serial small computer system interface (SAS) data to the common interface logic, communicatively coupled with the common interface logic, the emulation logic being configured for determining a value of a ConnectedSata signal for a serial ATA communication, the emulation logic including a SataConID register and a ConID multiplexer, the ConID multiplexer being communicatively coupled with the SataConID register, the SataCon ID register configured for being programmed with device ID information for a direct attached SATA device when the direct attached SATA device is present, thereby permitting identification of said direct attached SATA device, the ConID multiplexer configured for selecting between: a SAS ConID provided when a SAS device is present and a device ID associated with the SATA device when the SATA device is present, said device ID being included in the device ID information of the SataConID register,
   wherein the emulation logic generates at least one of asserting a ConnectedSata signal or deasserting a ConnectedSata signal based on the state of a host link state machine, the emulation logic being configured for accounting for a status of registers of a Phy layer and accounting for a status of registers of a port layer to an extent that data contained in the registers of the Phy layer and the port layer indicate conditions impacting the connection emulation.

2. The system of claim 1, wherein the emulation logic includes a connection emulation logic configured to assert/deassert a ConnectedSata signal based on the determined ConnectedSata value.

3. The system of claim 1, further comprising higher level logic communicatively coupled with the common interface logic wherein the higher level logic receives only communications conforming to serial SCSI communication and pseudo serial SCSI communication.

4. The system of claim 1, wherein the emulation logic includes an OpenConReq register and a CloseConReq register for indicating a port layer request to open a connection or close a connection, respectively.

5. The system of claim 1, wherein the emulation logic includes a physical layer module including PhyReady register for indicating OOB signaling has occurred with an attached device and a SataProt register for capturing a resultant OOB signal, the SataProt register indicating if the attached device is serial ATA type device or a serial SCSI type device.

6. The system of claim 1, wherein the emulation logic includes a link layer module including a current link state register for indicating the current state of a link state machine, a next link state register for indicating the next state of the link state machine, and rx_xrdy register for indicating if the last primitive received by the link state machine is a serial ATA request permission primitive (X_RDY).

7. A system for emulating a serial small computer system interface (serial SCSI) connection for direct attached serial advanced technology attachment (serial ATA) communication, comprising:
   a host controller including a first physical interface configured to connect with a serial SCSI device and a second physical interface configured to connect with a serial ATA device, the host controller including:
      an emulation logic configured for determining a value of a ConnectedSata signal for a serial ATA communication and configured for emulating a serial SCSI connection with the second physical interface by providing emulated serial small computer system interface (SAS) data to the common interface logic, the emulation logic including a SataConID register and a ConID multiplexer, the ConID multiplexer being communicatively coupled with the SataConID register, the SataCon ID register configured for being programmed with device ID information for a direct attached SATA device when the direct attached SATA device is present, thereby permitting identification of said direct attached SATA device, the ConID multiplexer configured for selecting between: a SAS ConID provided when a SAS device is present and a device ID associated with the SATA device when the SATA device is present, said device ID being included in the device ID information of the SataConID register;
      a common interface logic configured to receive serial SCSI communications from the first physical interface and serial ATA communications having an emulated serial SCSI connection from the emulation logic; and
      a high level logic that receives only communications conforming to serial SCSI communication protocol and pseudo serial SCSI communication, wherein the emulation logic generates at least one of asserting a ConnectedSata signal or deasserting a ConnectedSata signal based on the state of a host link state machine, the emulation logic being configured for accounting for a status of registers of a Phy layer and accounting for a status of registers of a port layer to an extent that data contained in the registers of the Phy layer and the port layer indicate conditions impacting the connection emulation.

8. The system of claim 7, further comprising higher level logic communicatively coupled with the common interface logic wherein the higher level logic receives only communications conforming to serial SCSI communication protocol and pseudo serial SCSI communication.

9. The system of claim 7, wherein the emulation logic includes an OpenConReq register and a CloseConReq register for indicating a port layer request to open a connection or close a connection, respectively.

10. The system of claim 7, wherein the emulation logic includes a physical layer module including a PhyReady register for indicating OOB signaling has occurred with an attached device and a SataProt register for capturing a resultant OOB signal, the SataProt register indicating if the attached device is serial ATA type device or a serial SCSI type device.

11. The system of claim 7, wherein the emulation logic includes a link layer module including a current link state register for indicating the current state of a link state machine, a next link state register for indicating the next state of the link state machine and rx_xrdy register for indicating if the last primitive received by the link state machine is a serial ATA request permission primitive (X_RDY).

12. A method of emulating a serial small computer system interface (serial SCSI) connection for serial advanced technology attachment (serial ATA) communication, comprising the steps of:
  implementing an out of band protocol (OOB) to determine if an attached device is a serial SCSI device or a serial ATA device;
  determining the current state of a link state machine and a next state of the link state machine;
  monitoring for at least one of a request to close a serial SCSI connection and a request to open a serial SCSI connection;
  emulating a serial SCSI connection for a serial ATA communication with said attached device based on the state of the attached device serial ATA link state machine if said attached device is a serial ATA device by providing emulated serial small computer system interface (SAS) data to the common interface logic,
  wherein emulating includes accounting for a status of registers of a Phy layer and accounting for a status of registers of a port layer to an extent that data contained in the registers of the Phy layer and the port layer indicate conditions impacting the connection emulation.

13. The method of claim 12, further comprising the step of providing high level logic only communications conforming to serial SCSI communication protocol and pseudo serial SCSI communication.

14. The method of claim 12, further comprising the step of selecting between the emulated serial communication and a standard serial SCSI communication based on the implemented OOB.

15. The method of claim 12, further comprising determining if the last primitive received by the link state machine is a serial ATA request primitive (X_RDY).

* * * * *